United States Patent
Kanemaki et al.

(10) Patent No.: US 12,241,545 B2
(45) Date of Patent: Mar. 4, 2025

(54) HYDRAULIC CONTROL SYSTEM FOR TRANSMISSION

(71) Applicant: KOMATSU LTD., Tokyo (JP)

(72) Inventors: Tomohiro Kanemaki, Tokyo (JP); Masaki Shiohara, Tokyo (JP)

(73) Assignee: KOMATSU LTD., Tokyo (JP)

( * ) Notice: Subject to any disclaimer, the term of this patent is extended or adjusted under 35 U.S.C. 154(b) by 355 days.

(21) Appl. No.: 17/784,721

(22) PCT Filed: Jan. 18, 2021

(86) PCT No.: PCT/JP2021/001504
§ 371 (c)(1),
(2) Date: Jun. 13, 2022

(87) PCT Pub. No.: WO2021/186876
PCT Pub. Date: Sep. 23, 2021

(65) Prior Publication Data
US 2023/0025188 A1 Jan. 26, 2023

(30) Foreign Application Priority Data
Mar. 19, 2020 (JP) ................ 2020-049909

(51) Int. Cl.
*F16H 59/46* (2006.01)
*F16H 59/44* (2006.01)
(Continued)

(52) U.S. Cl.
CPC ............ *F16H 59/46* (2013.01); *F16H 59/44* (2013.01); *F16H 59/48* (2013.01); *F16H 61/0262* (2013.01); *F16H 61/47* (2013.01)

(58) Field of Classification Search
CPC .......... F16H 59/44; F16H 59/46; F16H 59/48; F16H 59/50; F16H 61/02; F16H 61/0262; F16H 61/47; F16H 61/68
(Continued)

(56) References Cited

U.S. PATENT DOCUMENTS 5,257,193 A    10/1993    Kusaka et al.
6,117,048 A *    9/2000    Toyama ................. F16H 57/01
                                                                      477/143

(Continued)

FOREIGN PATENT DOCUMENTS

CN    101002010 A    7/2007
CN    101287876 A    10/2008
(Continued)

OTHER PUBLICATIONS

The International Search Report for the corresponding international application No. PCT/JP2021/001504, issued on Apr. 6, 2021.
(Continued)

*Primary Examiner* — Andrew Joseph Rudy
(74) *Attorney, Agent, or Firm* — Global IP Counselors, LLP

(57) ABSTRACT

A hydraulic control system for a transmission is provided with a power source, two drive wheels, a power transmission device, a hydraulic pump, a main valve, and a controller. The power transmission device is configured to be set to a plurality of speed stages. The main valve is disposed between the hydraulic pump and the power transmission device and adjusts the main pressure of hydraulic fluid supplied from the hydraulic pump to the power transmission device. The controller controls the main valve. The controller sets the main pressure to a pressure value derived by correcting a clutch holding pressure of the set speed stage based on a load applied to each of the drive wheels.

5 Claims, 3 Drawing Sheets

(51) Int. Cl.
*F16H 59/48* (2006.01)
*F16H 61/02* (2006.01)
*F16H 61/47* (2010.01)

(58) Field of Classification Search
USPC .......................................................... 701/50
See application file for complete search history.

(56) References Cited

U.S. PATENT DOCUMENTS

| | | | | |
|---|---|---|---|---|
| 8,322,481 | B2* | 12/2012 | Satake | B60W 10/06 |
| | | | | 180/305 |
| 2009/0111655 | A1 | 4/2009 | Hatanaka | |
| 2009/0217654 | A1 | 9/2009 | Iwamoto | |
| 2011/0314945 | A1 | 12/2011 | Brandenburg et al. | |
| 2013/0156604 | A1* | 6/2013 | Kim | F04B 23/04 |
| | | | | 417/2 |
| 2017/0045139 | A1 | 2/2017 | Novak et al. | |
| 2019/0039577 | A1 | 2/2019 | Nishimura et al. | |
| 2019/0112788 | A1 | 4/2019 | Enomoto et al. | |

FOREIGN PATENT DOCUMENTS

| | | | |
|---|---|---|---|
| CN | 102292572 | A | 12/2011 |
| CN | 106233044 | A | 12/2016 |
| CN | 108473136 | A | 8/2018 |
| CN | 108779816 | A | 11/2018 |
| EP | 1 541 773 | A2 | 6/2005 |
| JP | 62-124343 | A | 6/1987 |
| JP | 4-366231 | A | 12/1992 |
| JP | 5-139132 | A | 6/1993 |
| JP | 8-326904 | A | 12/1996 |
| JP | 2001-56049 | A | 2/2001 |
| JP | 2001-74130 | A | 3/2001 |
| JP | 2009-150216 | A | 7/2009 |
| JP | 2010-174973 | A | 8/2010 |
| JP | 2014-163437 | A | 9/2014 |
| RU | 2001791 | C1 | 10/1993 |

OTHER PUBLICATIONS

The Office Action for the corresponding Chinese application No. 202180007242.1, issued on Oct. 12, 2023.

Yunhai Jia et al., Practice of hydraulically controlled interlocking clutch lockout for heavy vehicles published in the Mining & Processing Equipment, pp. 76-78; Sep. 10, 2007; ISSN:1001-3954.

Jianmin Zhao, Electrically Controlled Hydraulic Automatic Speed Change Technology published in Technology & Economy in Areas of Communications, pp. 99-101; Mar. 5, 2010; ISSN 1008-5696.

* cited by examiner

HYDRAULIC CONTROL SYSTEM FOR TRANSMISSION

CROSS-REFERENCE TO RELATED APPLICATIONS

This application is a U.S. National stage application of International Application No. PCT/JP2021/001504, filed on Jan. 18, 2021. This U.S. National stage application claims priority under 35 U.S.C. § 119(a) to Japanese Patent Application No. 2020-049909, filed in Japan on Mar. 19, 2020, the entire contents of which are hereby incorporated herein by reference.

BACKGROUND

Technical Field

The present disclosure relates to a hydraulic control system for a transmission.

Background Information

Conventionally, an automatic transmission for automatically switching speed stages is used in a work vehicle (for example, a wheel loader, a dump truck, a bulldozer, a forklift, etc.) provided with drive wheels.

Japanese Patent Laid-open No. 2001-74130 discloses a multistage transmission mechanism for changing speeds by selectively engaging a plurality of clutches, and a hydraulic control device for adjusting hydraulic fluid supplied to the clutches.

SUMMARY

The clutch holding pressure for holding the clutches in the engaged state in Japanese Patent Laid-open No. 2001-74130 is different for each clutch. Specifically, a higher clutch holding pressure is required so that a larger torque is imparted to a clutch corresponding to a gear used in a low speed stage in comparison to a clutch corresponding to a gear used in a high speed stage while the clutches are engaged.

In this case, the pressure of the hydraulic fluid supplied to the power transmission device from the hydraulic pump driven by the engine is adjusted to meet a desired main pressure at the main valve. The main pressure is set to a value slightly higher than the highest pressure value among the required holding pressures of the clutches in order to suppress sliding by the clutches due to variations in the loads.

However, when a high speed stage is selected (that is, when only the clutch corresponding to the gear used in the high speed stage is in the engaged state), loss occurring in the hydraulic pump increases and fuel consumption of the work vehicle drops because the main pressure is higher than necessary.

An object of the present disclosure is to provide a hydraulic control system for a transmission with which loss in a hydraulic pump can be suppressed.

A hydraulic control system for a transmission according to the present disclosure is mounted in a work vehicle, the hydraulic control system for a transmission being provided with a power source, a plurality of drive wheels, a power transmission device, a hydraulic pump, a main valve, and a controller. The power transmission device can be set to a plurality of speed stages and transmits driving power from the power source to the plurality of drive wheels. The hydraulic pump is driven by the power source. The main valve is disposed between the hydraulic pump and the power transmission device and adjusts a main pressure of hydraulic fluid supplied from the hydraulic pump to the power transmission device. The controller is configured to control the main valve. The controller corrects a clutch holding pressure of a speed stage set among the plurality of speed stages, based on a load applied to the plurality of drive wheels. The controller sets the corrected clutch holding pressure to the main pressure.

According to the present disclosure, a hydraulic control system for a transmission with which loss in a hydraulic pump can be suppressed can be provided.

DESCRIPTION OF EMBODIMENTS

An embodiment of a hydraulic control system for a transmission according to the present disclosure will be explained below in detail with reference to the figures. The hydraulic control system for a transmission according to the present disclosure is mounted to a work vehicle provided with a plurality of drive wheels. The work vehicle may be, for example, a wheel loader, a dump truck, a bulldozer, a forklift, or the like but is not limited as such.

Figure 1:
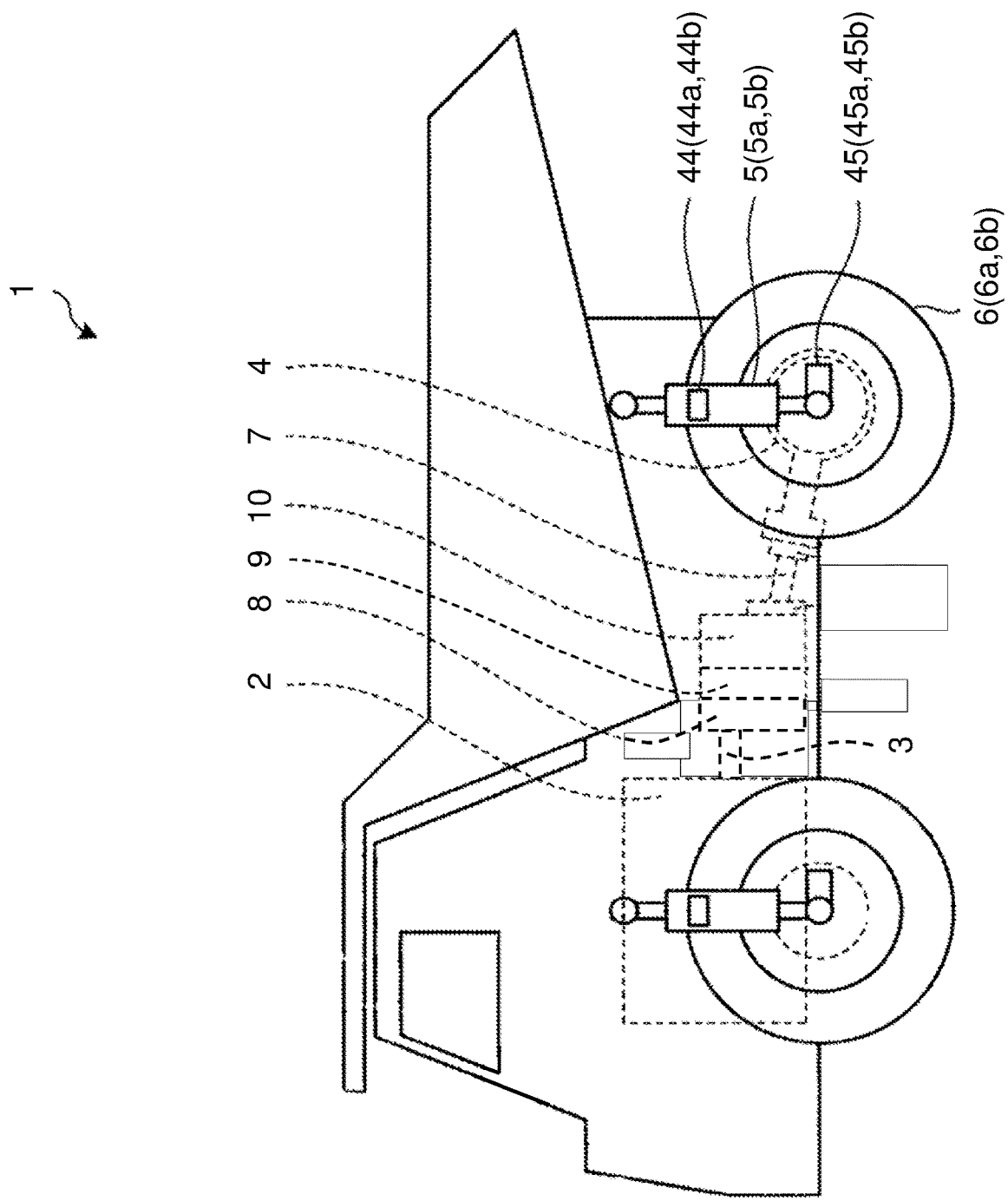
FIG. 1 is a side view of a work vehicle according to an embodiment.
Figure 2:
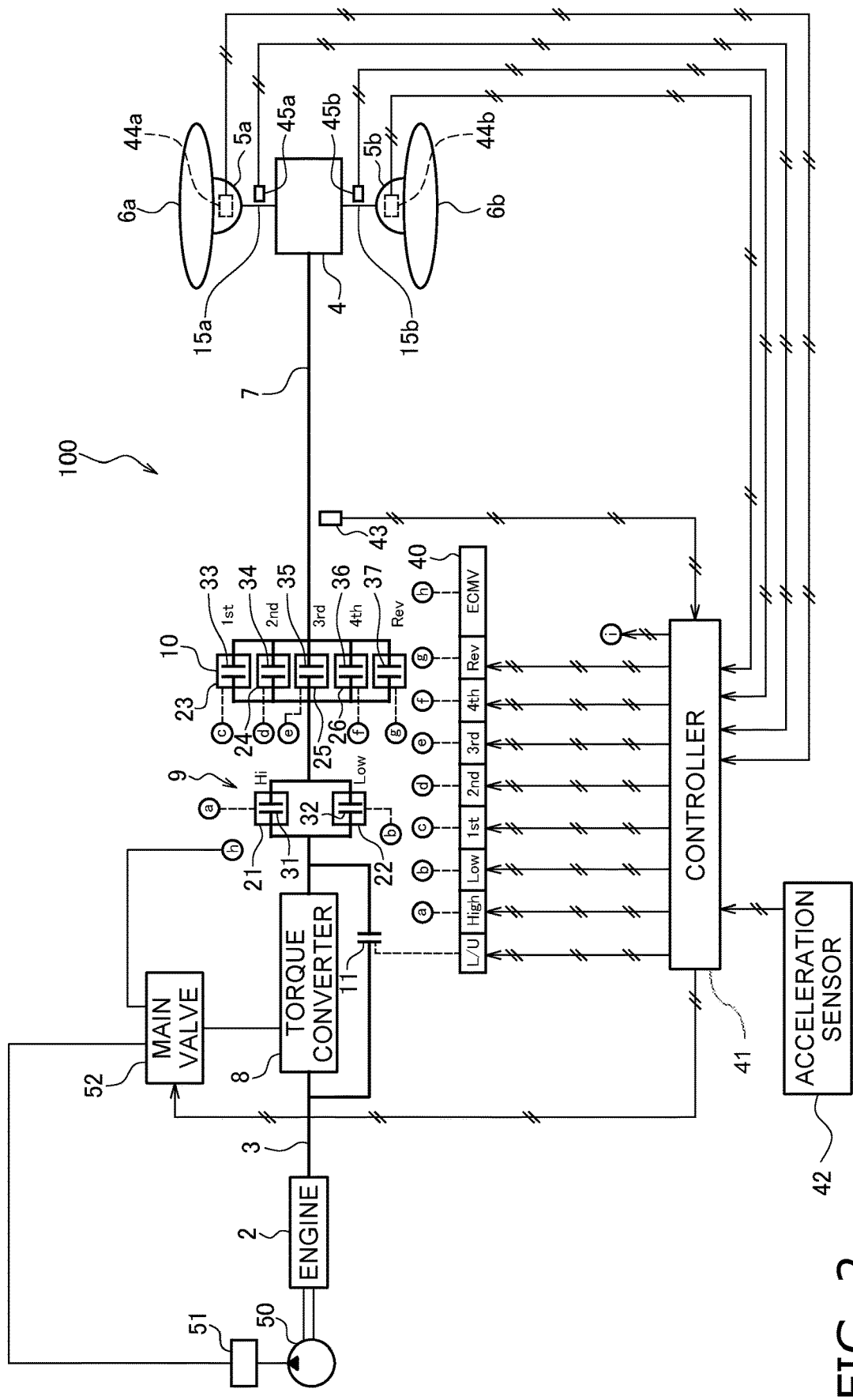
FIG. 2 is a configuration view of a hydraulic control system for a transmission according to the embodiment.

FIG. 1 is a side view of a work vehicle 1 according to the embodiment. FIG. 2 is a configuration view of a hydraulic control system 100 for a transmission according to the present embodiment.

The work vehicle 1 according to the present embodiment is a dump truck. The work vehicle 1 is provided with an engine 2, an input shaft 3, a differential device 4, suspension cylinders 5, drive wheels 6, an output shaft 7, a torque converter 8, an auxiliary transmission 9, and a main transmission 10. The engine 2 is an example of a power source. A pair of left and right suspension cylinders 5a and 5b are included in the suspension cylinder 5. A pair of left and right drive wheels 6a and 6b are included in the drive wheels 6.

The work vehicle 1 is further provided with suspension pressure sensors 44 and drive wheel rotation speed sensors 45. A pair of left and right suspension pressure sensors 44a and 44b are included in the suspension pressure sensors 44. A pair of left and right drive wheel rotation speed sensors 45a and 45b are included in the drive wheel rotation speed sensors 45.

The hydraulic control system 100 for a transmission illustrated in FIG. 2 is mounted to the work vehicle 1.

The hydraulic control system 100 for a transmission is provided with the input shaft 3 connected to an output shaft of the engine 2, and the output shaft 7 connected to the two drive wheels 6a and 6b via the differential device 4. The two drive wheels 6a and 6b are supported by the two suspension cylinders 5a and 5b. The suspension cylinders 5a and 5b are interposed between the drive wheels 6a and 6b and a vehicle body frame (not illustrated). The drive wheels 6a and 6b are coupled to the differential device 4 via drive shafts 15a and 15b. The number of drive wheels may be two or more.

A "power transmission device" is provided between the input shaft 3 and the output shaft 7. The power transmission device is configured by the torque converter 8, the auxiliary transmission 9, and the main transmission 10 disposed in said order from the input shaft 3 side. The power transmission device transmits driving power from the engine 2 to the two drive wheels 6a and 6b. Specifically, the driving power from the engine 2 is transmitted in the order of the input shaft 3, the torque converter 8, the auxiliary transmission 9, the main transmission 10, the output shaft 7, the differential device 4, and the drive shafts 15a and 15b, to the drive wheels 6a and 6b.

A hydraulic actuation-type lock-up clutch 11 is installed in the torque converter 8. The lock-up clutch 11 connects and disconnects a pump and a turbine of the torque converter 8.

The auxiliary transmission 9 is provided with a first gear train 21 and a second gear train 22, and a No. 1 clutch (Hi) 31 and a No. 2 clutch (Low) 32 respectively corresponding to the gear trains 21 and 22.

The main transmission 10 is provided with a third gear train 23, a fourth gear train 24, a fifth gear train 25, a sixth gear train 26, and a seventh gear train 27, and a No. 3 clutch (1st) 33, a No. 4 clutch (2nd) 34, a No. 5 clutch (3rd) 35, a No. 6 clutch (4th) 36, and a No. 7 clutch (Rev) 37 respectively corresponding to the gear trains 23 to 27.

The No. 1 clutch 31 to the No. 7 clutch 37 are all hydraulic actuation-type friction clutches. The gear trains corresponding to the clutches held in an engaged state among the No. 1 clutch 31 to the No. 7 clutch 37, function as power transmission elements. As illustrated in Table 1, by selectively combining and holding the No. 1 clutch 31 to the No. 7 clutch 37 in an engaged state, the power transmission device can be set to speed stages comprising a forward 1-speed to a forward 7-speed and a reverse 1-speed to a reverse 2-speed. The power transmission device can be set to a plurality of speed stages but the number of speed stages is not limited.

TABLE 1

| | | Hi No. 1 | Low No. 2 | 1st No. 3 | 2nd No. 4 | 3rd No. 5 | 4th No. 6 | Rev No. 7 |
|---|---|---|---|---|---|---|---|---|
| Forward | 1-speed | | | ○ | ○ | | | |
| | 2-speed | | ○ | | ○ | | | |
| | 3-speed | ○ | | | ○ | | | |
| | 4-speed | | ○ | | | ○ | | |
| | 5-speed | ○ | | | | ○ | | |
| | 6-speed | | ○ | | | | ○ | |
| | 7-speed | ○ | | | | | ○ | |
| Reverse | 1-speed | | ○ | | | | | ○ |
| | 2-speed | ○ | | | | | | ○ |

Electronic control modulation valves (referred to below as "ECMV") 40 are respectively connected to the lock-up clutch 11 and the No. 1 clutch 31 to the No. 7 clutch 37. The ECMVs 40 are each provided with a pressure control valve connected to the clutches 11 and 31 to 37, and an electromagnetic proportional valve for adjusting the size of the pilot pressure for actuating the pressure control valve. The ECMVs 40 perform incremental inflow control of the hydraulic fluid flowing into each of the clutches 31 to 37, by controlling the electromagnetic proportional valve in response to a command current from the controller 41.

A hydraulic pump 50 is driven by the engine 2. The hydraulic fluid discharged by the hydraulic pump 50 is supplied to a main valve 52 through a filter 51. The main valve 52 is disposed between the hydraulic pump 50 and the power transmission device. A portion of the hydraulic fluid supplied to the main valve 52 is supplied to the torque converter 8, and the remainder is supplied to the power transmission device through the ECMVs 40. The main valve 52 is controlled by the controller 41.

The controller 41 is configured mainly as a microcomputer comprising a central arithmetic processing device (CPU), a memory storing predetermined programs and various types of data, and peripheral circuits and the like.

The controller 41 adjusts the main pressure of the hydraulic fluid supplied from the hydraulic pump 50 to the power transmission device by controlling the main valve 52. The controller 41 corrects the "clutch holding pressure" of the set speed stage in the power transmission device, based on a "load" applied to the two drive wheels 6a and 6b, and sets the corrected clutch holding pressure as the main pressure.

The "clutch holding pressure" of the speed stage and the "load" applied to the two drive wheels 6a and 6b will be explained below.

The controller 41 previously stores a unique clutch holding pressure for each speed stage of the power transmission device. The clutch holding pressures are the pressures required to hold, in an engaged state, each of the clutches used in each of the speed stages of the power transmission device. The clutch holding pressures are derived by dividing, by the friction surface area of the clutch used in each speed stage, a multiplied value derived by multiplying the torque input from the torque converter 8 or the lock-up clutch 11 to the auxiliary transmission 9, by the speed reduction ratios of each speed stage.

The controller 41 is connected to an acceleration sensor 42, an output shaft rotation speed sensor 43, two suspension pressure sensors 44a and 44b, and two drive wheel rotation speed sensors 45a and 45b. The acceleration sensor 42 detects the acceleration of the work vehicle 1 and outputs the detection value to the controller 41. The acceleration sensor 42 may be, for example, an inertia measurement device (IMU). The controller 41 derives the rate of change of the acceleration per unit of time based on the detection values from the acceleration sensor 42. The output shaft rotation speed sensor 43 detects the rotation speed of the output shaft 7 and outputs the detection value to the controller 41. The controller 41 detects the speed of the work vehicle 1 based on the detection values from the output shaft rotation speed sensor 43 and derives the rate of change of the speed of the work vehicle 1 per unit of time. The suspension pressure sensors 44a and 44b detect the pressure (referred to below as "suspension pressure") in the bottom chambers of the suspension cylinders 5a and 5b. The controller 41 derives the rate of change of the suspension pressure per unit of time based on the detection values from the suspension pressure sensors 44a and 44b. The controller 41 may use the greater rate of change among the suspension pressures of the suspension cylinders 5a and 5b, or may use an average value of the rate of change among the suspension pressures of the suspension cylinders 5a and 5b. The drive wheel rotation speed sensors 45a and 45b detect the rotation speeds of the drive shafts 15a and 15b and output the detection values to the controller 41. The controller 41 derives the rate of change of the drive wheel rotation speed difference per unit of time based on the detection values from the drive wheel rotation speed sensors 45a and 45b.

When the work vehicle 1 is traveling over an irregular road surface, the acceleration, speed, and suspension pressures are likely to increase and decrease and large loads are applied to the drive wheels 6a and 6b accompanying the increase and decrease of the pressures. Therefore, when the work vehicle 1 is traveling over an irregular road surface, the loads applied to the drive wheels 6a and 6b are represented by the respective rates of change of the acceleration, the speed, and the suspension pressures.

In addition, when the work vehicle 1 moves off of a low-friction road and the tractive forces of the drive wheels 6a and 6b recover from a slipping state, the rate of change of the drive wheel rotation speed difference is likely to increase and decrease and large loads are applied to the drive wheels 6a and 6b accompanying the increase and decrease. Therefore, when the tractive force of the drive wheels 6a and 6b recovers from a slipping state, the loads applied to the drive wheels 6a and 6b are represented by the rate of change of the drive wheel rotation speed difference.

The controller 41 determines a "margin pressure" based on the greatest rate of change (referred to below as "maximum rate of change") among the rates of change of the acceleration, the speed, the suspension pressures, and the drive wheel rotation speed difference. The margin pressure is the excess pressure required to suppress slipping of the clutches of each speed stage set in the power transmission device, caused by the loads (road surface resistance) applied to the drive wheels 6a and 6b. While the method for determining the margin pressure from the maximum rate of change is not limited in particular, a correspondence table or a relational expression of margin pressures and maximum rates of change is preferably stored in advance by the controller 41.

The controller 41 corrects the clutch holding pressure based on the loads applied to the drive wheels 6a and 6b, by adding the margin pressure to the clutch holding pressure. The controller 41 sets the main pressure to the pressure value corrected based on the loads. The controller 41 controls the main valve 52 so that the main pressure of the hydraulic fluid supplied from the hydraulic pump 50 to the power transmission device becomes the set value.

In this way, because the main pressure of the main valve 52 is set to the pressure value derived by correcting the clutch holding pressure based on the loads applied to the drive wheels 6a and 6b, a necessary and sufficient margin pressure can be added to the clutch holding pressure only when there is a concern that the clutches may slip. Consequently, loss of the hydraulic pump is reduced in comparison to when the margin pressure is constantly included in the main pressure. As a result, fuel consumption of the work vehicle 1 can be improved.

(Hydraulic Control Method)

Figure 3:
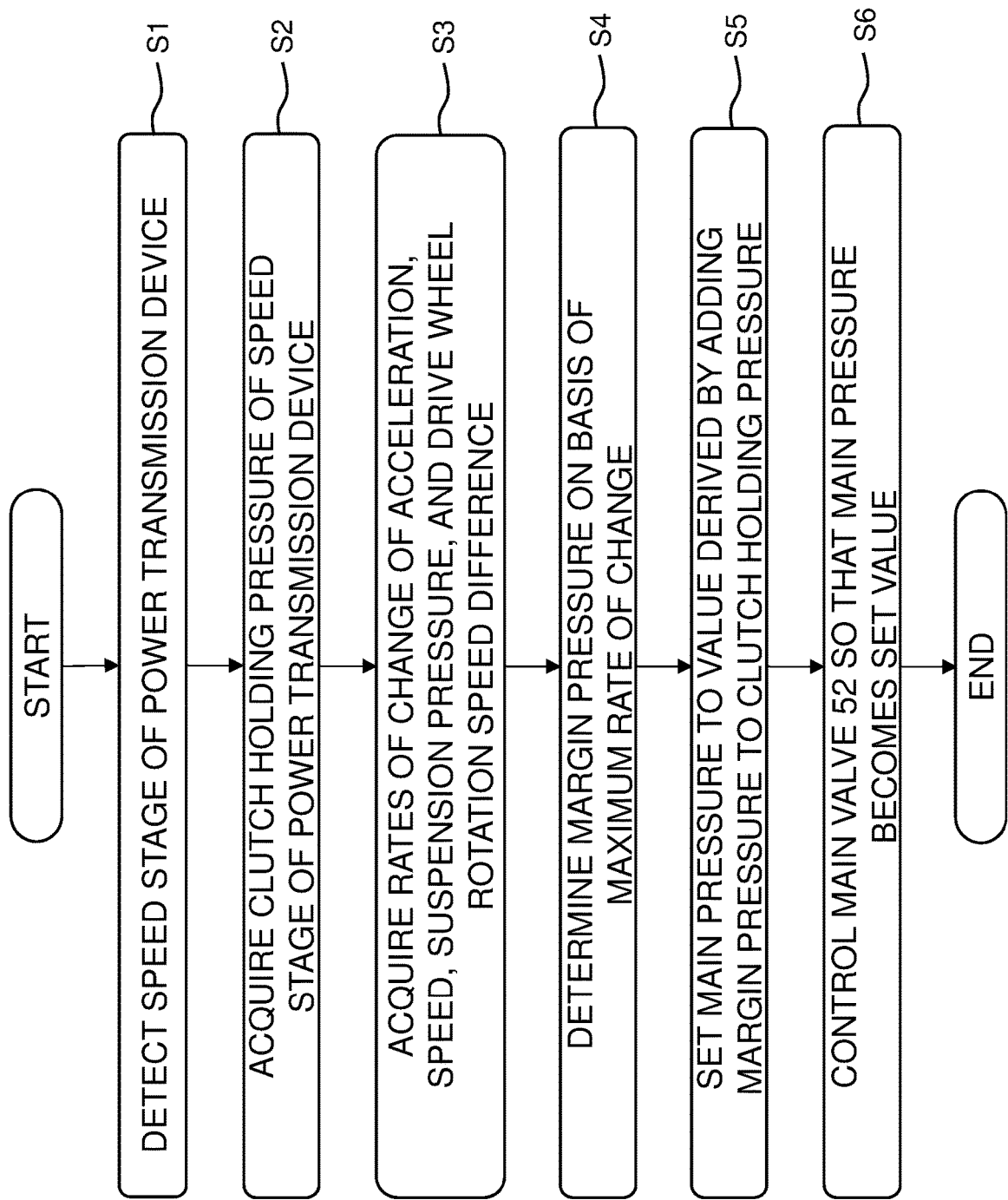
FIG. 3 is a flow chart for explaining a hydraulic control method according to the embodiment.

FIG. 3 is a flow chart for explaining a hydraulic control method of the hydraulic control system 100 for a transmission. In the following explanation, the work vehicle 1 is traveling.

In step S1, the controller 41 detects the speed stage set in the power transmission device.

In step S2, the controller 41 acquires the clutch holding pressure of the speed stage set in the power transmission device.

In step S3, the controller 41 acquires the respective rates of change of the acceleration, the speed, the suspension pressure, and the drive wheel rotation speed difference.

In step S4, the controller 41 determines the margin pressure based on the maximum rate of change which is the greatest rate of change among the respective rates of change of the acceleration, the speed, the suspension pressure, and the drive wheel rotation speed difference.

In step S5, the controller 41 sets the main pressure to the pressure value derived by adding the margin pressure to the clutch holding pressure.

In step S6, the controller 41 controls the main valve 52 so that the main pressure of the hydraulic fluid supplied from the hydraulic pump 50 to the power transmission device becomes the set value.

Modified Examples of the Embodiment

Although an embodiment of the present disclosure has been described so far, the present disclosure is not limited to the above embodiment and various modifications may be made within the scope of the disclosure.

Modified Example 1

While the controller 41 in the above embodiment determines the margin pressure based on the maximum rate of change which is the greatest rate of change among the respective rates of change of the acceleration, the speed, the suspension pressure, and the drive wheel rotation speed difference, the present disclosure is not limited in this way.

For example, one rate of change among the acceleration, the speed, the suspension pressure, and the drive wheel rotation speed difference may be used and fixed, or the use of any of the rates of change among the acceleration, the speed, the suspension pressure, and the drive wheel rotation speed difference may be changed as needed in response to the traveling state of the work vehicle 1.

Modified Example 2

While the controller 41 in the above embodiment uses the rate of change of the drive wheel rotation speed difference separately from the rate of change of the acceleration, the present disclosure is not limited in this way. The controller may set the main pressure to a pressure value derived by adding the margin pressure and the clutch holding pressure determined based on the added value of the rates of change of the acceleration and the drive wheel rotation speed difference. Consequently, when the tractive force of the drive wheels 6a and 6b recovers from a slip state, slipping of the clutches of the speed stages due to the loads applied to the drive wheels 6a and 6b can be suppressed.

Modified Example 3

While the controller in the above embodiment uses the speed of the work vehicle 1 to determine the margin pressure, the rotation speed of the output shaft 7 detected by the output shaft rotation speed sensor 43 may be used as the speed.

The invention claimed is:

1. A hydraulic control system for a transmission mounted in a work vehicle, the system comprising:
   a power source;
   a plurality of drive wheels;
   a power transmission device configured to be set to a plurality of speed stages and transmit driving power from the power source to the plurality of drive wheels;
   a hydraulic pump driven by the power source;
   a main valve disposed between the hydraulic pump and the power transmission device and adjusting a main pressure of hydraulic fluid supplied from the hydraulic pump to the power transmission device; and
   a controller configured to control the main valve, the controller being configured to set the main pressure to a pressure value derived by adding a margin pressure to a clutch holding pressure of a speed stage set among the plurality of speed stages based on a load applied to the plurality of drive wheels, the margin pressure being determined based on a load applied to the plurality of drive wheels.

2. The hydraulic control system for a transmission according to claim 1, wherein
the controller is configured to determine the margin pressure based on at least one rate of change among an acceleration of the work vehicle, a speed of the work vehicle, pressures in a plurality of suspension cylinders that support the plurality of drive wheels, and a rotation speed difference between the plurality of drive wheels.

3. The hydraulic control system for a transmission according to claim 2, wherein
the controller is configured to determine the margin pressure based on an added value of the rates of change of the acceleration of the work vehicle and the rotation speed differences of the plurality of drive wheels.

4. The hydraulic control system for a transmission according to claim 2, wherein
the speed of the work vehicle is a rotation speed of an output shaft of the power source.

5. The hydraulic control system for a transmission according to claim 3, wherein
the speed of the work vehicle is a rotation speed of an output shaft of the power source.

\* \* \* \* \*